United States Patent [19]

Aframian

[11] Patent Number: 4,892,987
[45] Date of Patent: Jan. 9, 1990

[54] MOUNTING FOR ELECTRICAL CONTROL

[75] Inventor: Mousa Aframian, Mansfield, Ohio

[73] Assignee: White Consolidated Industries, Inc., Cleveland, Ohio

[21] Appl. No.: 299,142

[22] Filed: Jan. 23, 1989

[51] Int. Cl.$^4$ ............................................. H01H 9/00
[52] U.S. Cl. .................................... 200/296; 248/27.1; 361/417
[58] Field of Search ............... 200/296, 295, 565, 294; 248/27.1, 343, 27.3; 285/161; 403/195; 361/346, 417, 419, 420

[56] References Cited

U.S. PATENT DOCUMENTS

| | | | |
|---|---|---|---|
| 2,522,172 | 9/1950 | Gates | 200/296 |
| 4,499,352 | 2/1985 | Fujita et al. | 200/296 |

Primary Examiner—Henry J. Recla
Assistant Examiner—Glenn T. Barrett
Attorney, Agent, or Firm—Pearne, Gordon, McCoy & Granger

[57] ABSTRACT

A screw mount control and adapter combination permits the screw mount control to be converted to a bushing mount control. The control cover is provided with a pair of openings therein through which screws are threaded when the control is mounted in its screw mount configuration. A bushing mount adapter is installed on the screw mount control by pressing projections on the adapter into the screw openings in the screw mount control. The material of the adapter is softer and more ductile than the material defining the screw openings in the control so that a simple press-in assembly is provided.

17 Claims, 3 Drawing Sheets

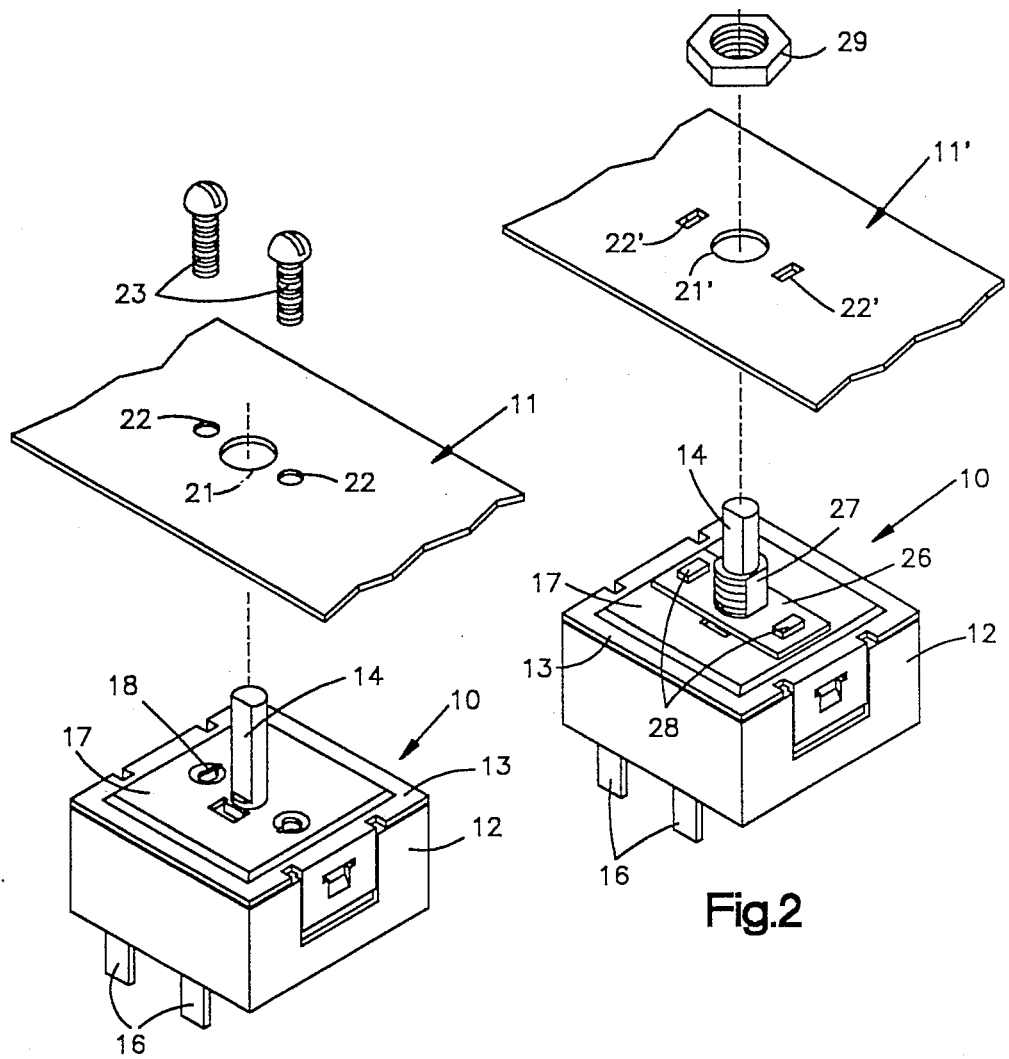

MOUNTING FOR ELECTRICAL CONTROL

BACKGROUND OF THE INVENTION

This invention relates generally to the mounting of controls on control panels, and more particularly to a novel and improved control and adapter permitting a given control to be mounted on a control panel in more than one manner.

PRIOR ART

One typical mounting arrangement for mounting a control on a control panel utilizes screws which extend through the control panel into the control housing to securely mount the control on the panel. Such mounting arrangement is hereinafter referred to as a "screw mounting arrangement." Another typical arrangement for mounting a control on a control panel is usually referred to as a "bushing mount." In a bushing mount arrangement, the control provides a bushing which projects through the panel. A nut is then threaded onto the bushing to secure the control in the mounted position.

If the control is intended for screw mounting, it is constructed to permit such mounting and generally cannot be used for bushing mounting. Conversely, if the control is constructed for bushing mounting, it cannot normally be used as a screw-mounted control. Therefore, in the past it has normally been necessary to produce an inventory of a given control in two separate styles if the control is to be available as a screw mount control and a bushing mount control.

Since controls are often produced in very large quantities by expensive automated equipment, the cost of the automated production equipment is greatly increased when duplicate production lines are required to produce two styles of a given control. Further, the inventory costs are substantially increased when two styles of controls must be inventoried.

U.S. Pat. No. 2,522,172 discloses a control a control and an adapter intended to overcome these problems of production and inventory costs by providing a control and an adapter which converts a screw mount control to a bushing mount control. Such adapter, however, includes at least two separate parts and two screws, all of which must be produced, assembled, and installed to convert the screw mount control to a bushing mounting control. Therefore, although such adapter can reduce production and inventory costs, the costs of conversion of the controls are relatively high.

SUMMARY OF THE INVENTION

The illustrated embodiment of the present invention provides a novel and improved control and adapter combination which permits the economical conversion of a screw mount control to a bushing mount control. The illustrated embodiment of the present invention is an infinite switch electric range control of the type which is installed on the control panel of an electric cooking range by two screws. For screw mounting, the control is mounted on the control panel by two screws which extend through openings in the control panel and are threaded into openings in the control housing. The illustrated control also provides a rotary shaft operator which extends through the control panel and on which typical control knobs are mounted. The control per se, in its screw mounting configuration, is old in the art. Such controls have been produced in large quantities with highly automated equipment.

In accordance with the present invention, a simple, one-piece molded adapter is provided to convert the screw mount control to a bushing mount control. When bushing mount controls are required, the adapter is mounted on the control by a simple press-on assembly in which the adapter is permanently mounted on the control. Since the adapter is a onepiece element which is installed by simply pressing the adapter onto the control, a low-cost conversion is provided from the screw mount control to a bushing mount control.

The adapter provides an integral, externally threaded bushing which fits around the shaft operator of the control and a pair of simple, unthreaded, cylindrical projections. These projections are sized with respect to the screw openings with an interference fit, and are formed of a material which is softer and more ductile than the housing material in which the screw holes are formed.

During the installation of the adapter, the projections are pressed straight into the screw openings. The interference fit causes the projection material and the material forming the screw holes to deflect from their unstressed condition. Once installed, the springback of both materials causes the projections to be securely gripped and produces a permanent mounting of the adapter on the control.

The adapter also includes forwardly projecting lugs which fit into associated apertures in the control panel to prevent rotation of the bushing-mounted control about the bushing axis. In its bushing mount configuration, the bushing is positioned through a control panel opening and a nut is threaded onto the bushing to secure the control on the control panel.

With this invention, controls can be produced of a single style which are all adapted to be mounted by a single mounting type. Then when a customer requires another type of mounting, a simple, low-cost adapter is installed by a simple, low-cost assembly procedure to convert the control to another form of mounting.

These and other aspects of this invention are illustrated in the accompanying drawings and are more fully described in the following specification.

BRIEF DESCRIPTION OF THE DRAWINGS

FIG. 1 is an exploded view of the control in its screw-mount configuration, illustrating the manner in which the control is mounted on a control panel by screws;

FIG. 2 is an exploded view, similar to FIG. 1, but illustrating the control after conversion to a bushing mount configuration;

DETAILED DESCRIPTION OF THE DRAWINGS

Figure 3:
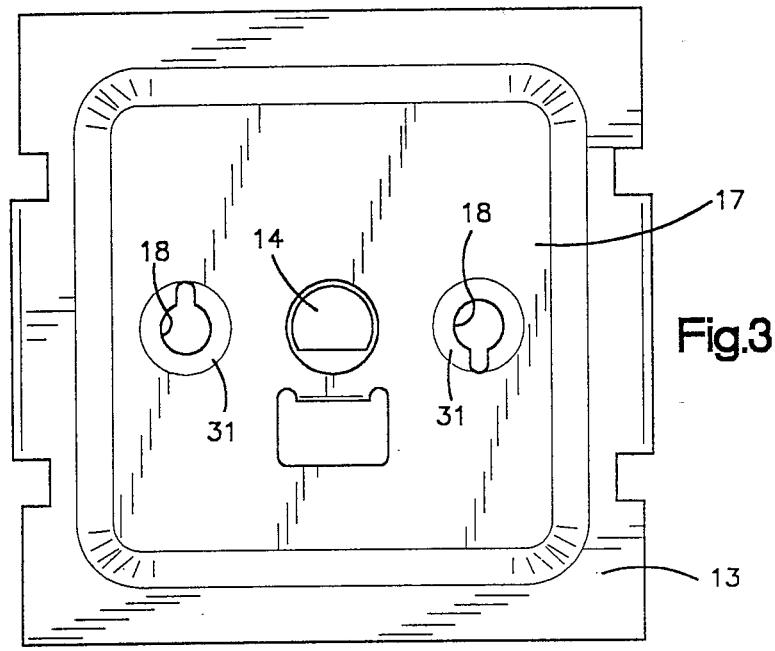
FIG. 3 is a plan view of the control in its screw mount configuration, illustrating the mounting surface of the control having screw receiving openings therein.

FIG. 1 illustrates a control 10 in its screw mounting configuration for mounting in a control panel 11. The control 10 provides a housing assembly including a generally rectangular housing body 12 closed on its forward side by a sheet metal cover plate 13. The illustrated control is an infinite switch of the type used to control the electric heating units of an electric cooking range. The control 10 provides a rotatable shaft operator 14 which projects forwardly from the cover plate 13 and is rotated to control the cycling of the switch contained within the housing body 12. It should be understood, however, that in its broader aspects the present invention can be applied to other types of controls and switches which are mounted in a control panel. Typically, the control 10 provides terminals 16 for fonnecting the control to the circuit of the appliance being controlled by the switch contained within the control.

The cover plate 13 is formed with a raised central portion which provides the mounting surface 17 for the control. The cover plate 13 also provides two screw mounting openings 18 extending through the mounting surface 17. The screw mounting openings 18 are positioned on opposite sides of the shaft operator 14.

The control panel 11 is provided with a central aperture 21 sized to receive the shaft operator 14 and a pair of screw apertures 22 positioned on opposite sides of the central aperture 21. When the control is mounted on the control panel 11, the mounting surface 17 of the control 10 is positioned against the rearward surface of the control panel 11 and the shaft operator 14 projects through the aperture 21, extending forwardly from the forward surface of the control panel. Screws 23 extends through the screw apertures 22 and are threaded into the openings 18 in the cover plate 13 to complete the mounting of the control. The screws function to securely mount the control on the control panel and prevent rotation of the control with respect to the axis of the shaft operator.

FIG. 2 illustrates the same control 10 with an adapter 26 mounted thereon, as discussed in detail below. When the adapter is installed on the control 10, it provides a tubular bushing 27 which is externally threaded and through which the shaft operator 14 extends. In the illustrated embodiment, the adapter 26 also provides a pair of forwardly facing, rectangular lugs 28, with one lug located on each side of the bushing 27. In this instance, the control panel 11' is formed with a central aperture 21' sized to receive the bushing 27 and an aperture 22' on each side of the central aperture 21' positioned and sized to receive the lugs 28 of the adapter 26.

When the control 10 and adapter combination is mounted, the adapter is positioned against the rearward face of the panel 11', with the shaft operator 14 and bushing 27 extending thorugh the central aperture 21'. A nut 29 is then threaded onto the bushing into engagement with the forward face of the control panel 11' to complete the mounting of the control. The lugs 28 cooperate with the apertures 22' to prevent the rotation of the control about the axis of the bushing 27 so that the control is firmly mounted in position.

In accordance with the present invention, the controls 10 are completely assembled in the screw mount configuration, normally with automated assembly tooling. The controls are therefore completed and can be installed with the screws 23. Normally, the controls in the screw mount configuration are inventoried as such and when bushing mount configurations are required, the adapters 26 are installed to meet the need for bushing mount controls. The completed controls can be manufactured with automated tooling, which does not require two separate assembly lines to produce controls with two different types of mounting structures.

Figure 4:
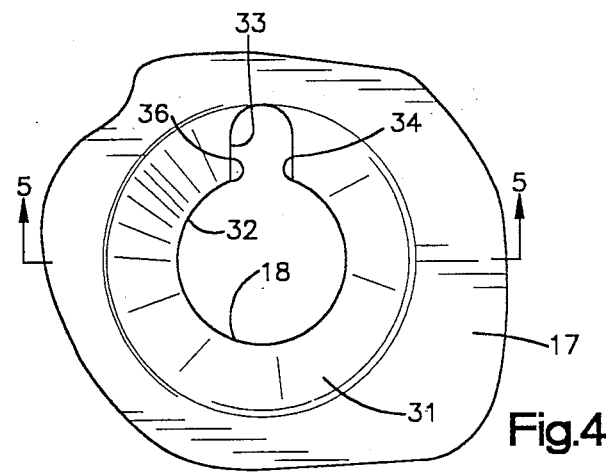
FIG. 4 is a greatly enlarged, fragmentary plan view of one of the screw openings.

Referring now to FIGS. 3 and 4, the preferred structure for the screw openings 18 provides a shallow, generally conical depression or recess 31 formed in the sheet metal of the cover plate 13 surrounding the openings 18. Each opening 18 provides a generally circular portion 32 extending from the location 34 to the location 36 along the majority of its periphery. The openings 18 also provide a small radially extending notch 33 at one location along the circumference of the opening. Further, the conical depression 31 is formed so that the circular portion 32 extends from the location 34 along a helix to the location 36 to provide a helical thread form extending for almost a full circle.

Figure 5:
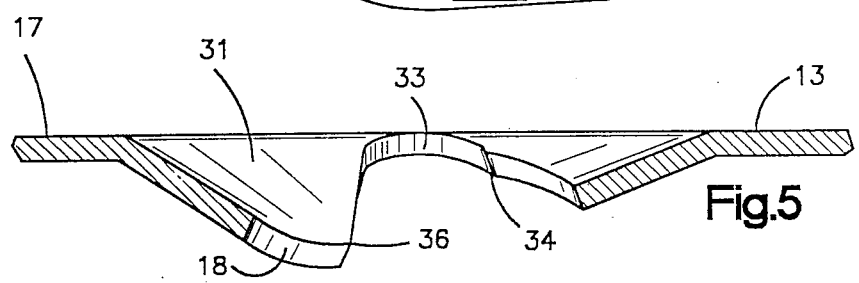
FIG. 5 is a fragmentary cross section taken along line 5—5 of FIG. 4.

As best illustrated in FIG. 5, by providing the notch 33, it is possible to form the conical depression so that the location 34 is closer to the plane of the mounting surface 17 than the location 36. With this structure, a helical female thread form is provided for substantial engagement with the screws 23 and provides a high strength connection. Further, when the screws 23 are tightened, the material forming the depression 31 tends to be deformed forwardly and inwardly, producing a self-locking connection with the screws.

Figure 6:
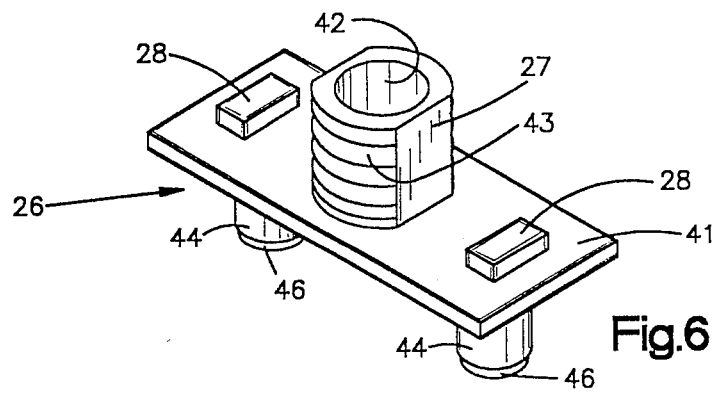
FIG. 6 is a perspective view of an adapter in accordance with the present invention before its installation on the control.
Figure 7:
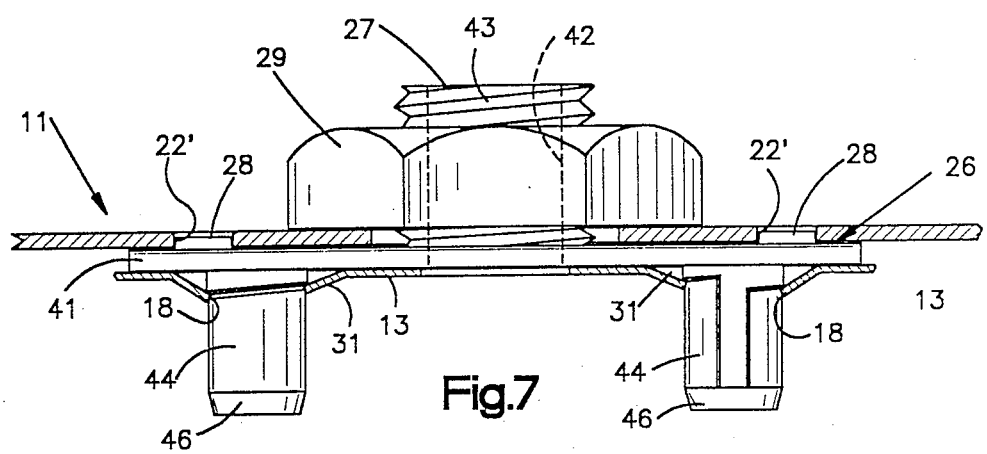
FIG. 7 is a greatly enlarged, fragmentary cross section of the mounted control in its bushing-mounted configuration.

The overall configuration of the adapter 26 is best illustrated in FIG. 6. The adapter 26 provides a substantially flat and elongated body portion 41 from which the centrally located bushing 27 extends. The bushing is tubular and the opening 42 therein extends competely through the adapter and is sized to closely fit the shaft operator 14. The lugs 28 project from the upper surface of the body portion 21 and are positioned and shaped to mate with the apertures 22'. The exterior surface of the bushing is provided with threads 43 to receive the nut 29 when the control on which the adapter 26 is mounted is installed on a control panel 11'.

Projecting from the lower surface of the body portion 41 are a pair of cylindrical, unthreaded projections 44 formed with inwardly tapered ends 46. The lugs 44 are provided with a diameter sized to provide an interference fit with the circular portion 32 of the screw mounting openings 18. In the illustrated embodiment, in which the cover plate 13 is formed of spring steel and the adapter is a one-piece, injection-molded zinc element, the lugs are preferably oversized to provide an interference fit with respect to the circular portion 32 by about 0.009 inch to 0.012 inch in diameter. The diameter of the illustrated circular portion 32 in the illustrated embodiment is about 0.133 inch to 0.136 inch.

Because the zinc material which forms the lugs 46 is substantially softer and more ductile than the material of the cover plate, the adapter 26 can be installed on the control 10 by merely positioning the adapter so that the bushing 27 surrounds the shaft operator 14 and the two lungs 44 are aligned with the opening 18. The lugs 44 are then pressed axially into the screw mounting openings 18.

Figure 8:
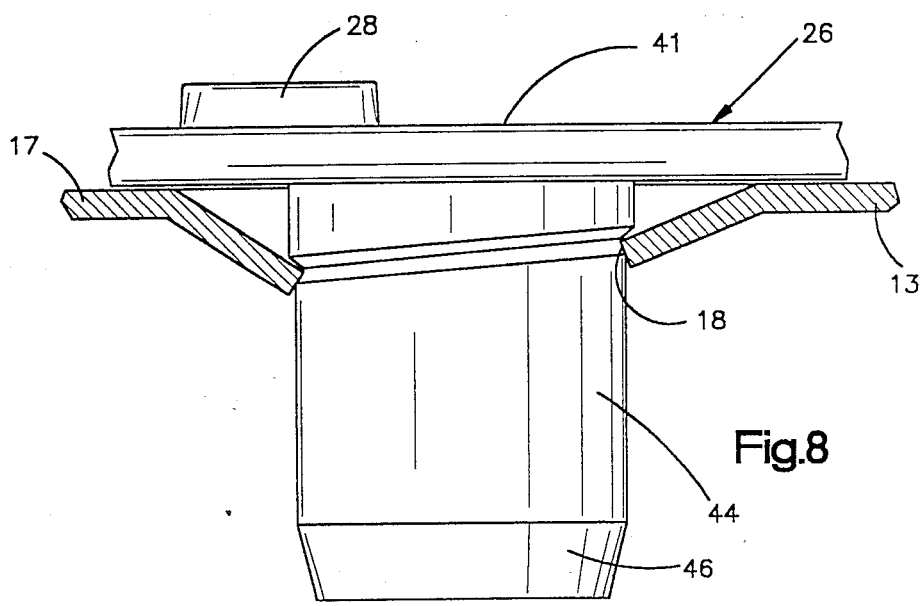
FIG. 8 is a greatly enlarged, fragmentary section, illustrating the manner in which the projections on the adapter are gripped by the edges of the screw mounting openings to permanently secure the adapter on the control for bushing mounting thereof.

During such axial insertion of the lugs 44 into the openings 18, the materials of both the lugs and the cover plate surrounding the lugs are deformed from their unstressed condition and the lugs smoothly enter the openings. The material of the cover, however, is not deformed beyond its elastic limit. At the completion of the installation of the adapter on the control, the underside of the body portion 41 of the adapter engages the mounting surface 17. When the lugs have been pressed into the openings, the materials of both the lug and the cover plate tend to spring back toward their original dimensions, causing the edges of the circular portion 32 to grip the lugs, as best illustrated in FIG. 8. This provides a permanent assembly of the control and the adapter and permits the combined unit to be installed as a bushing mount control.

In order to provide this simple, straight-in assembly of the lugs into the openings, the material forming the lugs should be substantially softer or more ductile than the material forming the cover. However, the material forming the adapter must also be sufficiently strong to provide a secure mounting of the control when it is installed in an appliance or the like.

Since the adapter 26 is a one-piece unit, and since it is installed by merely pressing it onto the control, the conversion cost to modify the control for bushing mounting is minimized, and even if automated tooling is used for such conversion, the expense of such tooling is relatively low.

It should be understood that within the broader aspects of this invention, the material forming the adapter 26 can be other than zinc so long as the ability for the adapter to be installed by a simple press-on operation is provided, and so long as the adapter provides sufficient strength for the mounting of the control in its intended use. Because the edges provided by the circular portion 32 are formed in a conical depression or recess, any tensile forces tending to withdraw the lugs from the openings 18 tend to cause such edges to bite into the projections to a greater extent and a very secure mounting of the adapter is provided. Further, the notch 32 allows the material of each recess to deflect by bending without excess hoop stresses. However, it has been determined by actual tests that the illustrated adapter can be installed securely even when the lugs are inserted into a simple planar opening formed in a cover plate without the conical depression 31.

Although the preferred embodiment of this invention has been shown and described, it should be understood that various modifications and rearrangements of the parts may be resorted to without departing from the scope of the invention as disclosed and claimed herein.

What is claimed is:

1. An infinite switch appliance control and adapter combination, said control without said adapter being mountable on a control panel of an appliance with threaded fasteners and with said adapter being mountable on a control panel of an appliance by a bushing mount, said control comprising a body assembly providing a metal mounting surface providing at least one screw receiving opening therein adapted to receive a threaded fastener for mounting said control, said control also providing an operator extending through said mounting surface, a one-piece bushing mount adapter having a tubular bushing portion encircling said operator adjacent to said mounting surface and providing external threads, said adapter also providing a projection extending through said screw opening with an interference fit to secure said adapter on said control against said mounting surface, said adapter being formed of a material which is softer and more ductile than the metal of said mounting surface, permitting said adapter to be mounted on said control by axially inserting said projection into said opening, said opening providing edges biting into the surface of said projection after said projection is inserted therein permanently securing said adapter on said body assembly, said adapter permitting mounting of said control on a control panel with said bushing portion and operator extending therethrough, and a nut received on said bushing portion for securing said control to said control panel.

2. An appliance control as set forth in claim 1, wherein said metal mounting surface provides a generally conical depression around said opening inclined inwardly and away from said mounting surface to said edges, wherein forces on said adapter tending to pull said projection out of said opening causing said edges to deflect inwardly into tighter engagement with said projection.

3. An appliance control as set forth in claim 1, wherein said adapter is a one-piece zinc molded element.

4. A control adapted to be mounted on a control panel comprising a body assembly providing a metal mounting surface, a rotatable control shaft projecting from said mounting surface, a pair of openings in said mounting surface spaced from said shaft adapted to receive threaded fasteners for mounting said control on said control panel with said shaft projecting therethrough, and a one-piece bushing mount adapter having a tubular bushing portion surrounding said shaft adjacent to said mounting surface and providing external threads adapted to receive a nut for securing said adapter and said control to a control panel requiring a bushing mount, said adapter also providing a projection extending through each of said openings with an interference fit mounting said adapter on said control against said mounting surface, said metal providing said mounting surface being spring steel, said projections being inserted into said openings with an interference fit causing the metal forming said openings to deflect as said projections pass through said openings, the material of said projections extending past said openings assuming a size greater than the size of said opening thereby preventing said projections from being withdrawn from said openings.

5. A control as set forth in claim 4, wherein said adapter is formed of a material softer than the metal forming said mounting surface.

6. A control as set forth in claim 5, wherein said openings are formed in generally conical depressions extending back from said mounting surface such that forces, which act on said adapter to withdraw said projections from said openings tend to deflect the material forming said depressions inwardly against said projections.

7. A control as set forth in claim 6, wherein said depressions provide a radial notch along one side thereof, said metal forming said mounting surface has an elastic limit, whereby insertion of said projections into said openings deflecting the material of said depressions within said elastic limit.

8. A method of converting screw-mounted controls to bushing mounted controls comprising producing controls having a mounting face with screw openings therein through which screws are threaded for screw-mounting said controls, forming a one-piece adapter having an integral bushing and an unthreaded projection sized to fit through each of said screw openings with an interference fit, and pressing said projections into associated openings without relative rotation, causing said projections to be tightly gripped in said associated screw openings to permanently mount said adapter on said control.

9. A method as set forth in claim 8, including forming said screw openings in a hard first material and said projections in a second material which is softer than said first material, and causing said first material to bite into said projections to secure said adapter on said control.

10. A method as set forth in claim 9, including using spring steel having an elastic limit for said first material and a non-ferrous metal for said second material.

11. A method as set forth in claim 10, including forming said screw openings in a generally conical depression inclined with decreasing diameter in a direction away from said mounting face, and providing a radially extending notch along one side of said recess, said notch allowing radial deflection of the edge of said opening within said elastic limit of said first material during insertion of said projections into said openings, wherein forces which act on said adapter to withdraw said projections from said associated screw openings tend to deflect the material of said depressions inwardly into tighter engagement with said projections.

12. A method as set forth in claim 10, including molding said asapters as one-piece zinc-molded elements.

13. A method as set forth in claim 12, including molding lugs on a side of said adapter remote from said projections, and positioning said lugs in apertures in a control panel to prevent rotation of said controls.

14. A method of producing controls selectively installable by screw-mounting and bushing-mounting, comprising assembling complete controls having screw openings into which screws are threaded for screw-mounting said controls onto a control panel, and installing bushing-mount adapters on only those controls requiring bushing mounting, said method including forming said adapters as a one-piece molded part having a threaded bushing portion and unthreaded cylindrical mounting projections, sizing said projections to fit into said screw openings with an interference fit, and installing said adapters on said controls by pressing said projections axially into said openings, and selecting materials forming said screw openings and said projections so that said projections are gripped in said openings and permanently held therein and providing a nut received on said bushing portion for securing said control to said control panel.

15. A method as set forth in claim 14, including forming said projections of a material which is softer and more ductile than the material in which said screw openings are formed.

16. A method as set forth in claim 15, including forming said screw openings in a spring metal.

17. A method as set forth in claim 16, including forming said projections of zinc.

* * * * *